(12) United States Patent
Chen et al.

(10) Patent No.: US 12,285,007 B2
(45) Date of Patent: Apr. 29, 2025

(54) INTELLIGENT AIR-ASSISTED SPRAYING DEVICE FOR ORCHARDS AND SPRAYING METHOD THEREOF

(71) Applicant: Intelligent Equipment Research Center, Beijing Academy of Agriculture and Forestry Sciences, Beijing (CN)

(72) Inventors: Liping Chen, Beijing (CN); Hanjie Dou, Beijing (CN); Changyuan Zhai, Beijing (CN); Fan Feng, Beijing (CN); Wei Zou, Beijing (CN); Si Li, Beijing (CN); Shuo Yang, Beijing (CN); Jian Song, Beijing (CN)

(73) Assignee: Intelligent Equipment Research Center, Beijing Academy of Agriculture and Forestry Sciences, Beijing (CN)

( * ) Notice: Subject to any disclaimer, the term of this patent is extended or adjusted under 35 U.S.C. 154(b) by 0 days.

(21) Appl. No.: 18/670,662

(22) Filed: May 21, 2024

(65) Prior Publication Data

US 2025/0064045 A1 Feb. 27, 2025

Related U.S. Application Data

(63) Continuation of application No. PCT/CN2024/089283, filed on Apr. 23, 2024.

(30) Foreign Application Priority Data

Aug. 25, 2023 (CN) .......................... 202311076593.5

(51) Int. Cl.
*A01M 7/00* (2006.01)

(52) U.S. Cl.
CPC ........ *A01M 7/0089* (2013.01); *A01M 7/0042* (2013.01); *A01M 7/0014* (2013.01)

(58) Field of Classification Search
CPC . A01M 7/0042; A01M 7/0089; A01M 7/0014
(Continued)

(56) References Cited

U.S. PATENT DOCUMENTS 5,251,818 A * 10/1993 Manor ................ A01M 7/0014
47/1.7
2018/0317372 A1* 11/2018 Schleicher ........... A01B 79/005
(Continued)

FOREIGN PATENT DOCUMENTS

BR 102015024365 A2 * 4/2016 .......... A01C 23/047
CN 107125229 A * 9/2017 .......... A01M 7/0042
(Continued)

*Primary Examiner* — Qingzhang Zhou
*Assistant Examiner* — Anna Thi Ho (57) ABSTRACT

An intelligent air-assisted spraying device for orchards includes a traction mechanism, a spaying system, a collecting system, and a processing-controlling system. The traction mechanism is provided with a spray tank. The spaying system includes a main body connected to the spray tank and multiple spraying tubes, first ends of the spraying tube are communicated with the main body, and second ends of the spraying tubes are capable of rotating. The collecting system is configured to collect a contour and a volume of the canopy, and branch and leaf density of a fruit tree. The processing-controlling system is configured to obtain multiple spraying areas, calculate an air outlet angle of each spraying tube, and control a rotation of the second end of each spraying tube according to the air outlet angle. The device can adjust the spraying direction of each spraying tube, and the quality of pesticide application can be improved.

10 Claims, 6 Drawing Sheets

(58) Field of Classification Search
USPC .......................................................... 239/11
See application file for complete search history.

(56) References Cited

U.S. PATENT DOCUMENTS

| | | | | |
|---|---|---|---|---|
| 2021/0212249 A1* | 7/2021 | Disberger | ........... | A01M 7/0089 |
| 2021/0219538 A1* | 7/2021 | Krosschell | .......... | A01M 7/0089 |
| 2021/0285558 A1* | 9/2021 | Ruppert | ................... | F16K 1/222 |
| 2022/0396263 A1* | 12/2022 | Smith | .................. | G05D 1/0223 |

FOREIGN PATENT DOCUMENTS

| | | | | |
|---|---|---|---|---|
| CN | 206658918 U | * | 11/2017 | |
| CN | 107912408 A | * | 4/2018 | |
| CN | 108812208 A | * | 11/2018 | ............. A01G 25/02 |
| CN | 109845715 A | * | 6/2019 | ........... A01B 79/005 |
| CN | 111937834 A | * | 11/2020 | ........... A01M 7/0025 |
| CN | 112106757 A | * | 12/2020 | |
| CN | 112189643 A | * | 1/2021 | |
| CN | 112273356 A | * | 1/2021 | |
| CN | 212488162 U | * | 2/2021 | ........... A01M 7/0025 |
| CN | 113303308 A | * | 8/2021 | |
| CN | 113331158 A | * | 9/2021 | |
| CN | 115005181 A | * | 9/2022 | |
| CN | 114868721 B | * | 1/2023 | |
| CN | 116058356 A | * | 5/2023 | |
| CN | 116138017 A | * | 5/2023 | |
| CN | 116530489 A | * | 8/2023 | |
| CN | 116548412 A | * | 8/2023 | ............ A01M 7/005 |
| CN | 116569902 A | * | 8/2023 | |

\* cited by examiner

INTELLIGENT AIR-ASSISTED SPRAYING DEVICE FOR ORCHARDS AND SPRAYING METHOD THEREOF

TECHNICAL FIELD

The disclosure relates to the technical field of agricultural machinery, and particularly to an intelligent air-assisted spraying device for orchards and a spraying method thereof.

BACKGROUND

Chemical control of pests and diseases in orchards is one of the most effective means of control. Surveys indicate that the application of pesticides to fruit trees, ranging from 8 to 15 times within a year, can help fruit farmers to recover significant economic losses. Air-assisted spraying is an advanced and highly efficient application technique recommended by the Food and Agriculture Organization of the United Nations (FAO) and is internationally recognized as an efficient ground-based application technique. Air-assisted spraying utilizes high-speed air currents to further atomize the droplets emitted from the nozzle into fine, even particles. This process enhances the adhesion of the droplets. The powerful airflow agitates the leaves and carries the droplets deep into the inner canopy of the target, enhancing their penetration. As a result, all areas of the fruit trees, including the underside and upper side of leaves, as well as the inner and outer canopy, are evenly coated with the droplets.

Currently, most spraying machines on the market are only suitable for spraying operations on a single type or shape of fruit trees. The spraying machines are incapable of adjusting the spraying operation in real-time based on varying growth stages, tree shapes, canopy volumes, and the density of branches and leaves of different fruit trees. During the spraying process, airflow that is either too weak or too strong can lead to pesticide drift, resulting in environmental pollution in agricultural fields. Therefore, in terms of spraying control, most spraying machines are limited to individual control and cannot achieve a simultaneous, integrated control of spray volume, air speed, air volume, and airflow direction.

In orchards, fruit trees have a variety of shapes (for example, apple trees typically are in a conical or pyramidal shape, peach trees are typically in an open-vase or inverted trapezoidal shape, and pear trees are typically in an inverted trapezoidal or conical shape). In previous studies, air deflectors were used to change the direction of the spraying airflow. Although the method in previous studies can change the airflow direction to some extent, it is incapable of control the airflow target-oriented distribution in fruit tree canopy according to the specific contour shapes of the fruit trees.

SUMMARY

The disclosure provides an intelligent air-assisted spraying device for orchards and a spraying method thereof, which is to solve the deficiency in the related art where spraying devices are unable to perform target-oriented pesticide application based on the contour shapes of fruit trees.

An intelligent air-assisted spraying device for orchards is provided, which includes a traction mechanism, a spaying system, a collecting system, and a processing-controlling system. The traction mechanism is provided with a spray tank. The spaying system includes a main body and multiple spraying tubes, the main body is connected to the spray tank, first ends of the multiple spraying tube are communicated with the main body, second ends of the multiple spraying tubes are configured to spray pesticide liquid, and the second ends of the multiple spraying tubes are capable of rotating. The collecting system is disposed on the traction mechanism and is configured to collect a contour of a canopy, a volume of the canopy, and branch and leaf density of a fruit tree. The processing-controlling system is disposed on the traction mechanism and is configured to perform grid partitioning on the canopy of the fruit tree based on the contour of the canopy, the volume of the canopy, and the branch and leaf density of the fruit tree to obtain multiple spraying areas, calculate an air outlet angle of each spraying tube according to the multiple spraying areas, and control a rotation of the second end of each spraying tube according to the air outlet angle of each spraying tube, thereby to match a spraying range of the multiple spraying tube with the contour of the canopy of the fruit tree.

In an embodiment, the collecting system includes an image collector and a lidar. The image collector is configured to collect the contour of the canopy of the fruit tree, and the lidar is configured to collect the volume of the canopy, and the branch and leaf density of the fruit tree.

In an embodiment, the spaying system further includes a fan, multiple nozzles and multiple switch valves. The fan is connected to the main body. The second end of each spraying tube is in a duckbill structure, and the multiple nozzles are disposed in sequence along an extension direction of a length of the duckbill structure of each spraying tube. The multiple switch valves are disposed at the multiple nozzles, respectively. The processing-controlling system is further configured to control turning on or turning off of the plurality of switch valves based on the multiple spraying areas.

In an embodiment, the spaying system further includes an installation bracket and multiple second motors. The installation bracket is connected to the main body, the installation bracket includes a pair of longitudinal rods disposed opposite to each other, and the multiple spraying tubes are disposed in sequence along an extension direction of a length of each longitudinal rod. The multiple second motors are connected to the second ends of the multiple spraying tubes, respectively, and each second motor is configured to adjust an orientation of the respective spraying tube.

In an embodiment, the spaying system further includes multiple adjustment mechanisms. The multiple adjustment mechanisms are configured to adjust air outlet areas of the multiple spraying tubes, respectively. Each adjustment mechanism includes a first motor, a transmission component and multiple fan blades. The first motor is disposed in the main body. The transmission component is disposed in the respective spraying tube, and the transmission component is connected to the first motor. The multiple fan blades are disposed in an annular manner along an inner wall of the respective spraying tube. First sides of the multiple fan blades are connected to the transmission component, second sides of the multiple fan blades are enclosed to define an air outlet, and the transmission component is configured to rotate to drive the multiple fan blades to rotate to adjust an area of the air outlet.

In an embodiment, the transmission component of each adjustment mechanism includes a bevel gear, a first gear, a rotating disc and multiple second gears. The bevel gear is connected to the first motor. The first gear meshes with the bevel gear. An outer side and an inner side of the rotating disc are provided with teeth, and the outer side of the rotating disc meshes with the first gear. The multiple second gears are disposed in an annular manner along the inner side of the rotating disc, each second gear meshes with the inner side of the rotating disc, and the multiple second gears are respectively connected to the multiple fan blades.

In an embodiment, the processing-controlling system includes an industrial computer and a controller. The industrial computer is configured to perform the grid partitioning on the canopy of the fruit tree based on the contour of the canopy, the volume of the canopy, and the branch and leaf density of the fruit tree to obtain the multiple spraying areas. The controller is configured to calculate the air outlet angle of each spraying tube according to the spraying areas, and control the rotation of the second end of each spraying tube according to the air outlet angle of each spraying tube, thereby to match the spraying range of the multiple spraying tube with the contour of the canopy of the fruit tree.

A spraying method of the intelligent air-assisted spraying device for orchards is further provided and includes steps as follows:

collecting the contour of the canopy, the volume of the canopy, and the branch and leaf density of the fruit tree;

obtaining feature information of the fruit tree based on the contour of the canopy, the volume of the canopy, and the branch and leaf density of the fruit tree, and performing the grid partitioning on the canopy of the fruit tree based on the feature information of the fruit tree to obtain the multiple spraying areas; and calculating the air outlet angle of each spraying tube according to the spraying areas, and controlling the rotation of the second end of each spraying tube according to the air outlet angle of each spraying tube.

In an embodiment, the spraying method further includes:

obtaining a rotation angle of the second end of each spraying tube;

establishing an airflow demand model based on the contour of the canopy, the volume of the canopy, the branch and leaf density of the fruit tree and the rotation angle of the second end of each spraying tube;

controlling the air outlet area of each spraying tube based on the airflow demand model.

In an embodiment, the spraying method further includes:

calculating an air speed and an air volume of each spraying tube based on the air outlet area of each spraying tube;

establishing an intelligent spraying model based on the contour of the canopy, the volume of the canopy, the branch and leaf density of the fruit tree, the rotation angle of the second end of each spraying tube, the air speed of each spraying tube and the air volume of each spraying tube;

calculating a spray volume demand for each spraying area based on the intelligent spraying model; and controlling each nozzle to be turned on or turned off based on the spray volume demand of each spraying area.

In an embodiment, a controller of the intelligent air-assisted spraying device is connected to a direct current motor through an encoder and a driver, and the direct current motor is connected to a speed regulating fan. The controller is configured to send a signal to drive and regulate a rotation of the direct current motor, thereby achieving speed regulation of the fans.

The disclosure provides the intelligent air-assisted spraying device for orchards that, through providing the collecting system, the processing-controlling system, and the rotatable second end of each spraying tube, can adjust the spraying directions of the spraying tubes in real-time according to the variations in the canopy contour of different fruit trees. This enables target-oriented spraying, which maximizes the deposition of pesticides within the canopy of the target trees and minimizes pesticide drift in non-target areas, thereby enhancing the quality of pesticide application.

BRIEF DESCRIPTION OF DRAWINGS

In order to provide a clearer explanation of the technical solutions of the disclosure or the related art, a brief introduction will be given below to the attached drawings required in the embodiments of the disclosure or related art descriptions. It is evident that the attached drawings in the following description only illustrate some embodiments of the disclosure. For those skilled in the art, other attached drawings can be obtained based on these drawings without creative labor.

DESCRIPTION OF REFERENCE SIGNS

10. traction mechanism; 11. spray tank; 12. main body; 22. spraying tube; 23. installation bracket; 24. second motor; 25. fan; 26. fan blade; 31. image collector; 32. lidar; 41. industrial computer; 42. controller; 100. spraying area; 221. switch valve; 231. longitudinal rod; 271. bevel gear; 272. first gear; 273. rotating disc; 274. second gear; 28. first motor; 29. nozzle.

DETAILED DESCRIPTION OF EMBODIMENTS

In order to clarify the purposes, technical solutions, and advantages of the disclosure, the following will provide a clear and complete description of the technical solutions in conjunction with the attached drawings. Apparently, the described embodiments are a part of the embodiments of the disclosure, not all of them. Based on the embodiments in the disclosure, in all other embodiments obtained by those skilled in the art without creative labor fall within the scope of protection of the disclosure.

The features of the terms "first" and "second" in the specification and claims of the disclosure may explicitly or implicitly include one or more of these features. In the description of the disclosure, unless otherwise specified, "multiple" means two or more.

The following describes an intelligent air-assisted spraying device for orchards and a spraying method of the disclosure in conjunction with FIGS. 1-6.

Figure 1:
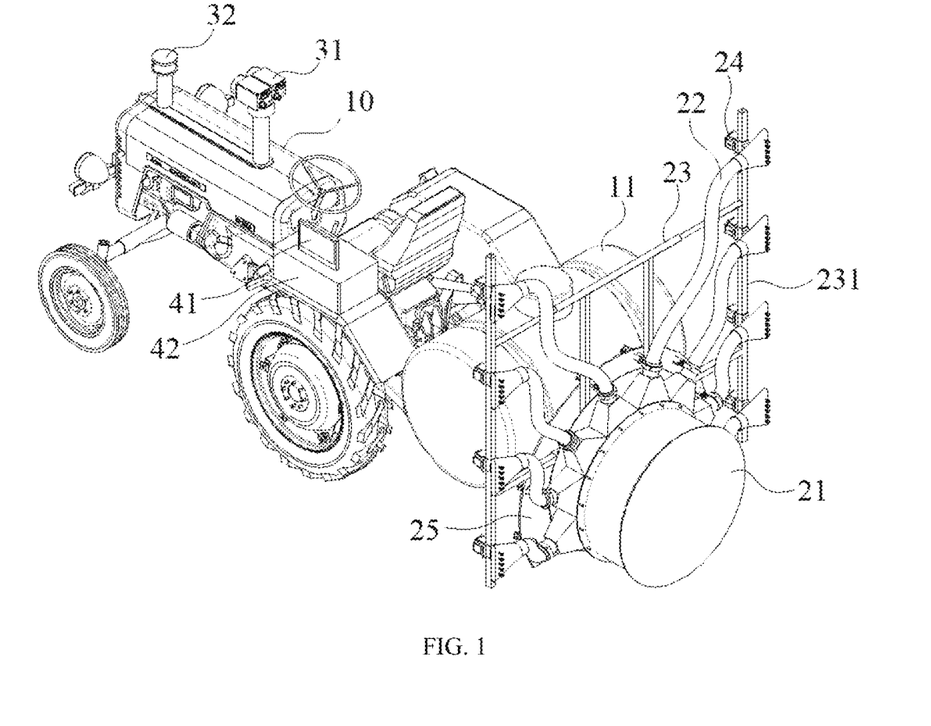
FIG. 1 illustrates a schematic structural diagram of an intelligent air-assisted spraying device for orchards in an embodiment of the disclosure.

As shown in FIG. 1, the intelligent air-assisted spraying device for orchards includes a traction mechanism 10, a spaying system, a collecting system and a processing-controlling system. The traction mechanism 10 is provided with a spray tank 11, the spaying system includes a main body 21 and multiple spraying tubes 22, the main body 21 is connected to the spray tank 11, first ends of the multiple spraying tube 22 are communicated with (i.e., connected with) the main body 11, second ends of the multiple spraying tubes 22 are configured to spray pesticide liquid, and the second ends of the multiple spraying tubes 22 are capable of rotating. The collecting system is disposed on the traction mechanism 10 and is configured to collect a contour of a canopy, a volume of the canopy, and branch and leaf density of a fruit tree. The processing-controlling system is disposed on the traction mechanism 10 and is configured to perform grid partitioning on the canopy of the fruit tree based on the contour of the canopy, the volume of the canopy, and the branch and leaf density of the fruit tree to obtain multiple spraying areas 100. The processing-controlling system is further configured to calculate an air outlet angle of each spraying tube 22 according to the spraying areas 100, and control a rotation of the second end of each spraying tube 22 according to the air outlet angle of each spraying tube 22, thereby to match a spraying range of the multiple spraying tubes 22 with the contour of the canopy of the fruit tree.

Specifically, the traction mechanism 10 moves along the rows of fruit trees (i.e., orchard rows), and the collecting system scans the contour of the canopy, the volume of the canopy, and the branch and leaf density of each fruit tree on two sides of the traction mechanism 10 in real time to obtain collected data. The collected data (including the position of the canopy, the contour of the canopy, the volume of the canopy, and the branch and leaf density of each fruit tree) is sent to the processing-controlling system, the processing-controlling system obtains feature information of each fruit tree based on the contour of the canopy, the volume of the canopy, and the branch and leaf density of each fruit tree. The processing-controlling system performs the grid partitioning on the canopy of each fruit tree based on its feature information to obtain multiple spraying areas 100 of each fruit tree. The processing-controlling system further calculates the air outlet angle of each spraying tube 22 according to the spraying areas 100, and controls the rotation of the second end of each spraying tube 22 according to the air outlet angle of each spraying tube 22, thereby matching the spraying range of the multiple spraying tubes 22 with the contour of the canopy of the fruit tree.

In an embodiment, the second end of each spraying tube 22 is capable of rotating, thereby making the outlet of each spraying tube 22 face towards the fruit tree. Further, the fan shaped pesticide mist sprayed from the multiple spraying tubes 22 can cover the contour of the canopy of the fruit tree.

The intelligent air-assisted spraying device for orchards can adjust the spray directions of the spraying tubes in real time according to the changes of the contour of the canopy of different fruit trees by providing the collecting system, processing-controlling system and the rotatable second end of each spraying tube, so as to achieve target-oriented spraying, maximize the precipitation in the pesticide canopy chamber and the drift of pesticides in non-target areas, and improve the quality of spraying.

As shown in FIG. 1, the collecting system includes an image collector 31 and a lidar 32. The image collector 31 is configured to collect the contour of the canopy of the fruit tree. The lidar 32 is configured to collect the volume of the canopy, and the branch and leaf density of the fruit tree.

Specifically, the traction mechanism can be one of various traction vehicles. In the embodiment, the traction mechanism is a tractor. A lifting bracket is disposed on the traction mechanism 10, and the image collector 31 and the lidar 32 are disposed on the lifting bracket. When the lifting bracket is lifted, the heights of the image collector 31 and lidar 32 can be adjusted, and the heights of the image collector 31 and the lidar 32 can be adjusted according to the heights of different fruit trees. Furthermore, the image collector 31 and the lidar 32 achieve non-contact measurement of target-oriented objects based on the principle of time of flight (TOF). In an embodiment, the image collector 31 may be a camera or a depth camera.

As shown in FIG. 1, in the embodiment, the processing-controlling system includes an industrial computer 41 and a controller 42. The industrial computer 41 is configured to perform the grid partitioning on the canopy of the fruit tree based on the contour of the canopy, the volume of the canopy, and the branch and leaf density of the fruit tree to obtain the multiple spraying areas 100. The controller 42 is configured to calculate the air outlet angle of each spraying tube 22 according to the spraying areas 100, and control the rotation of the second end of each spraying tube 22 according to the air outlet angle of each spraying tube 22, thereby to match the spraying range of the multiple spraying tubes 22 with the contour of the canopy of the fruit tree.

Specifically, the traction mechanism 10 moves along the rows of the fruit trees, and the image collector 31 scans the contour of the canopy of each fruit tree on two sides of the traction mechanism 10 in real time, the lidar 32 scans the volume of the canopy, and the branch and leaf density of each fruit tree on the two sides of the traction mechanism 10 in real time to obtain collected data. The image collector 31 and the lidar 32 send the collected data to the industrial computer 41. The industrial computer 41 obtains the feature information of the fruit tree based on the contour of the canopy, the volume of the canopy, and the branch and leaf density of the fruit tree, and performs the grid partitioning on the canopy of the fruit tree based on the feature information of the fruit tree to obtain the multiple spraying areas 100. The controller 42 calculates the air outlet angle of each spraying tube 22 according to the spraying areas 100, and controls the rotation angle of the second end of each spraying tube 22 according to the air outlet angle of each spraying tube 22, thereby to match the spraying range of the multiple spraying tubes 22 with the contour of the canopy of the fruit tree.

In an embodiment, the collecting system further includes multiple angle sensors (e.g. airflow outlet area angle sensor and airflow direction angle sensor), each angle sensor is used to detect the actual rotation angle of the respective spraying tube 22. The angle sensors send the detected actual rotation angles of the spraying tubes 22 to the controller 42 to establish a closed-loop control, thereby completing the accurate control of real-time airflow directions.

In an embodiment, the controller 42 is configured to establish an airflow demand model based on the contour of the canopy, the volume of the canopy, the branch and leaf density of the fruit tree as well as the rotation angle of the second end of each spraying tube 22, then calculate the airflow demands of different parts (i.e., different locations) of the fruit tree based on the airflow demand model, that is, the air outlet area of each spraying tube 22. The controller 42 is further configured to calculate air volume and air speed of each spraying tube 22 according to the air outlet area of each spraying tube 22, thereby achieving accurate control of air speed and air volume at different parts of the fruit tree.

Figure 2:
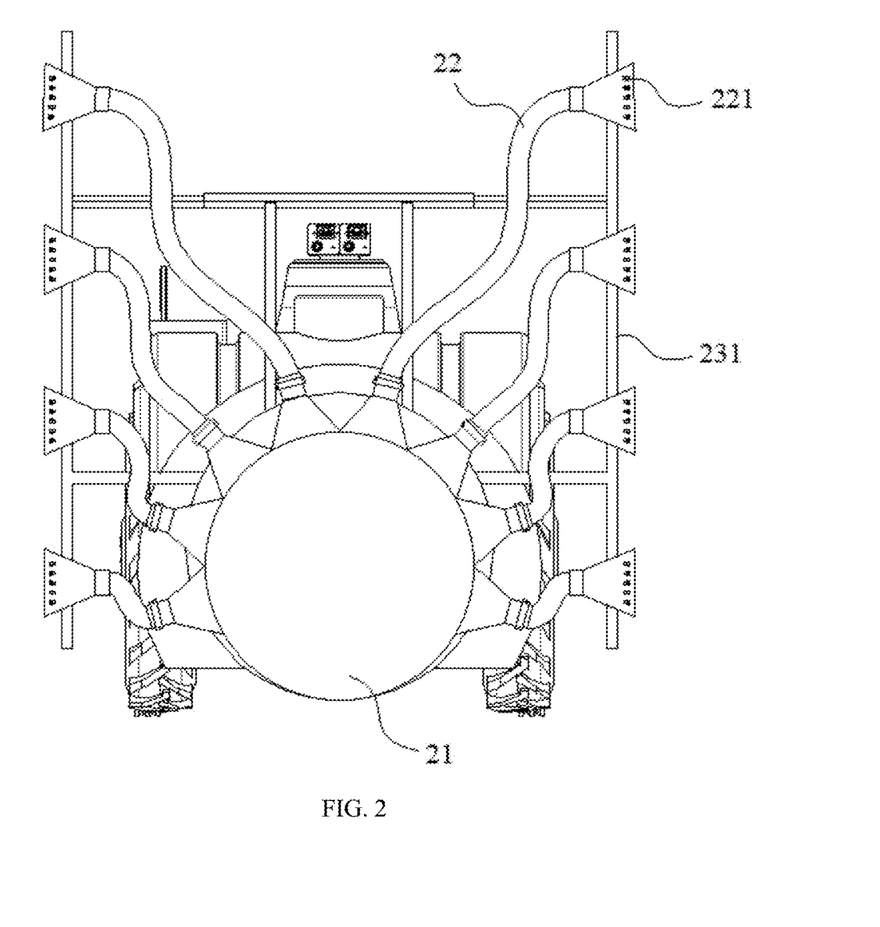
FIG. 2 illustrates a schematic cross-sectional diagram of a spaying system illustrated in FIG. 1 in the embodiment of the disclosure.

Specifically, as shown in FIGS. 1-2, the spaying system further includes an installation bracket 23, and multiple second motors 24.

Specifically, in the embodiment, the installation bracket 23 is connected to the main body 21, the installation bracket 23 includes a pair of longitudinal rods 231 disposed opposite to each other, and the multiple spraying tubes 22 are disposed in sequence along an extension direction of a length of each longitudinal rod 231. The second end of each spraying tube 22 is connected to a respective second motor 24, when the second motor 24 rotates, the second motor 24 can drive the second end of the respective spraying tube 22 to rotate, thereby adjusting an orientation of each spraying tube 22 to match the range of the spraying liquid with the contour of the canopy of the fruit tree.

In an embodiment, the controller 42 calculates the air outlet angle of each spraying tube 22 according to the spraying areas 100, and controls the rotation of the second motors 24 according to the air outlet angle to drive the rotation of the spraying tubes 22. The angle sensors detect the actual rotation angles of the spraying tubes 22, and send the actual rotation angles to the controller 42, the controller 42 controls the rotation of the second motors 24 according to the actual rotation angle to fine tune the rotation angle of the spraying tubes 22, so that the actual rotation angles of the spray tubes 22 are consistent with the theoretical rotation angles, thus realizing the accurate control of the air outlet angles, that is, the accurate control of the spray angles.

Figure 3:
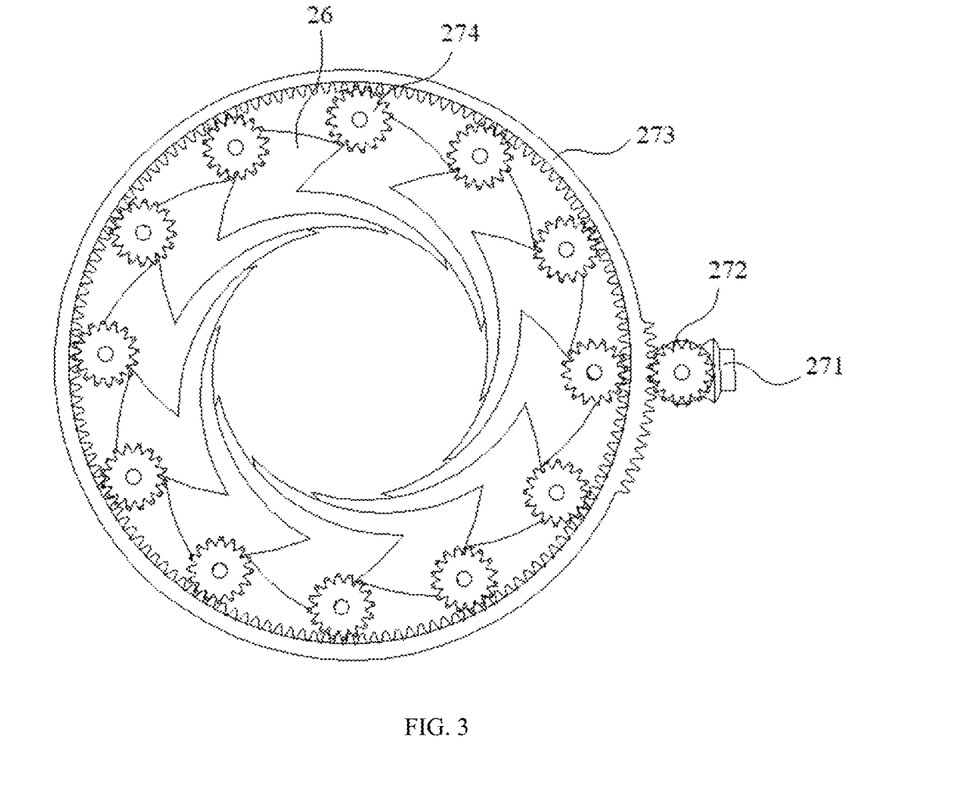
FIG. 3 illustrates a schematic structural diagram of a transmission component in the embodiment of the disclosure.

As shown in FIG. 3, in the embodiment, the spaying system includes multiple adjustment mechanisms, each adjustment mechanism is configured to adjust the air outlet area of the respective spraying tube 22. Each adjustment mechanism includes a first motor, a transmission component and multiple fan blades. The first motor is disposed in the main body 21. The transmission component is disposed in the respective spraying tube 22, and the transmission component is connected to the first motor. The multiple fan blades 26 are disposed in an annular manner along an inner wall of the respective spraying tube, first sides of the multiple fan blades are connected to the transmission component, second sides of the multiple fan blades 26 are enclosed to define an air outlet, and the transmission component is configured to rotate to drive the multiple fan blades 26 to rotate to adjust an area of the air outlet.

Specifically, the multiple fan blades 26 are disposed circularly along the inner wall of the spraying tube 22, and parts of the adjacent two fan blades 26 are overlapped. The first side of each fan blade 26 is connected with the transmission component, and the second sides of the multiple fan blades 26 are enclosed to form a circular hole, which is the air outlet. In the embodiment, when the first motor rotates, it can drive the transmission component to rotate. Specifically, when the first motor rotates in the forward direction, the overlapping areas of multiple fan blades 26 increase, and the area of the circular hole increases, that is, the area of the air outlet increases. Correspondingly, when the first motor reverses, the overlapping areas of multiple fan blades 26 decrease, and the area of the circular hole decreases, that is, the area of the air outlet decreases.

In an embodiment, as shown in FIG. 3, the transmission component further includes a bevel gear 271, a first gear 272, a rotating disc 273 and multiple second gears 274. The bevel gear 271 is connected to the first motor. The first gear 272 meshes with the bevel gear 271. An outer side and an inner side of the rotating disc 273 are provided with teeth, and the outer side of the rotating disc 273 meshes with the first gear 272. The multiple second gears 274 are disposed in an annular manner along the inner side of the rotating disc 273, each second gear 274 meshes with the inner side of the rotating disc 273, and each second gear 274 is connected to the respective fan blade 26.

Specifically, a rotation shaft of the first motor extends through the respective spraying tube 22 and into the respective spraying tube 22. The outer side of the rotating disc 273 is only partially provided with teeth, and the bevel gear 271 and the first gear 272 are both disposed in the respective spraying tube 22. A filler is disposed between the outer side of the rotating disc 273 and the inner wall of the respective spraying tube 22 to prevent air from flowing through the gap between the outer side of the rotating disc 273 and the inner wall of the respective spraying tube 22. When the first motor rotates, the first motor drives the bevel gear 271 to rotate, thereby to drive the first gear 272 to rotate. The first gear 272 drives the rotating disc 273 to rotate, and the rotating disc 273 drives multiple second gears 274 to rotate. Each second gear 274 drives the respective fan blade 26 to rotate, thereby adjusting the area of the air outlet.

In an embodiment, the controller 42 calculates the area of the air outlet of each spraying tube 22 according to the airflow demand model, and then controls the rotation direction and speed of the first motor according to the area of the air outlet, thereby controlling the rotation of each fan blade 26 to adjust the area of the air outlet.

The intelligent air-assisted spraying device for orchards provides multiple fan blades in each spraying tube, the second sides of the multiple fan blades are enclosed to form a circular hole. When the transmission component drives the multiple fan blades to rotate, the area of the air outlet is adjustable, and the air volume and air speed of each spraying tube can be adjusted according to the contour of the canopy and the branch and leaf density of the fruit tree. In addition, when adjusting the area of the air outlet, the air volume can be ensured to be uniform.

In the embodiment, as shown in FIG. 2, the spaying system further includes a fan 25, multiple nozzles and multiple switch valves 211. The second end of each spraying tube 22 is provided with the multiple nozzles. Each nozzle is provided with a respective switch valve 221. The processing-controlling system is further configured to control turning on or turning off of the multiple switch valves based on the spraying areas 100.

Specifically, the controller 42 is configured to establish an intelligent spraying model based on the contour of the canopy, the volume of the canopy, the branch and leaf density of the fruit tree, the rotation angle of the second end of each spraying tube 22, the air speed of each spraying tube 22 and the air volume of each spraying tube 22. Then a spray volume demand for each spraying area 100 is calculated based on the intelligent spraying model, followed by controlling the turning on or turning off of each nozzle based on the spray volume demands of each spraying area 100.

Specifically, in the embodiment, the second end of each spraying tube 22 is in a duckbill structure, and the multiple nozzles are disposed in sequence along an extension direction of a length of the duckbill structure. Each nozzle is provided with the respective switch valve 221 to individually control whether each nozzle sprays or not. In the embodiment, the controller 42 is configured to control each switch valve 221 to be turned on or turned off according to the spray volume demand of each spraying area 100, thereby achieving precise spraying and avoiding liquid waste.

The intelligent air-assisted spraying device for orchards of the disclosure is capable of automatically adjusting the spraying direction of each spraying tube according to different shapes of the fruit trees. It can regulate the air speed and the air volume at the air outlet based on the canopy structure and the density of branches and leaves. Additionally, it allows for the adjustment of the spray volume according to the spraying areas. The intelligent air-assisted spraying device for orchards meets the spraying demands of fruit trees at various times, different varieties, and with different contour shapes. It achieves directional spraying and enables variable rate spraying according to the pesticide demands at different positions in the canopy, making the application of pesticides more precise and effective.

Figure 4:
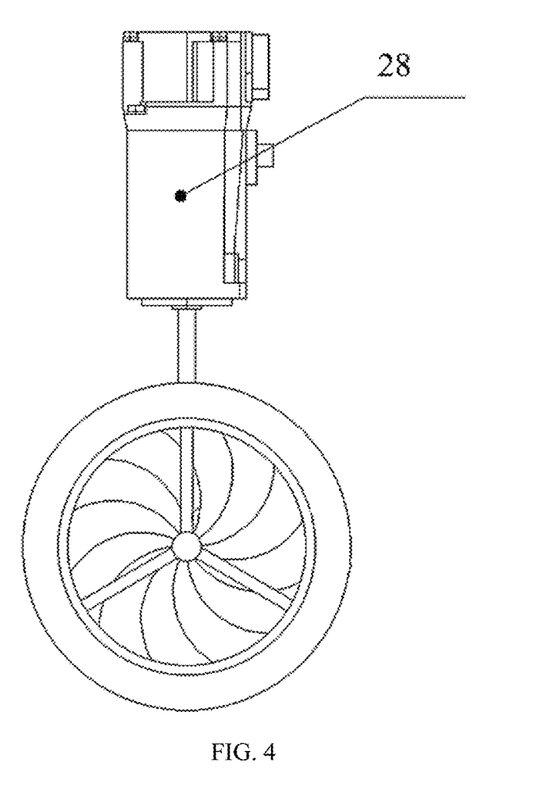
FIG. 4 illustrates a schematic flowchart of a method for using the intelligent air-assisted spraying device for orchards in the embodiment of the disclosure.

In the embodiment, as shown in FIG. 4, a spraying method of the intelligent air-assisted spraying device for orchards includes steps as follows.

Step 01: the contour of the canopy, the volume of the canopy, and the branch and leaf density of the fruit tree are collected.

Step 02: the feature information of the fruit tree is obtained based on the contour of the canopy, the volume of the canopy, and the branch and leaf density of the fruit tree, and the grid partitioning of the canopy of the fruit tree is performed based on the feature information of the fruit tree to obtain the multiple spraying areas 100.

Step 03: the air outlet angle of each spraying tube 22 is calculated according to the multiple spraying areas 100, and the rotation of the second end of each spraying tube 22 is controlled according to the air outlet angle.

Specifically, the traction mechanism 10 moves along the row of the fruit trees, and the image collector 31 scans the contour of the canopy of each fruit tree on two sides of the traction mechanism 10 in real time, the lidar 32 scans the volume of the canopy, and the branch and leaf density of each fruit tree on the two sides of the traction mechanism 10 in real time. The image collector 31 and the lidar 32 send the collected data (i.e., the position of the canopy, the contour of the canopy, the volume of the canopy, and the branch and leaf density of each fruit tree) to the industrial computer 41. The industrial computer 41 obtains the feature information of the fruit tree based on the contour of the canopy, the volume of the canopy, and the branch and leaf density of the fruit tree, and then performs grid partitioning of the canopy of the fruit tree based on the feature information of the fruit tree to obtain the multiple spraying areas 100. The controller 42 calculates the air outlet angle of each spraying tube 22 according to the spraying areas 100, and controls each spraying tube 22 to rotate according to the air outlet angle, thereby matching the spraying range of the multiple spraying tubes 22 with the contour of the canopy of the fruit tree. The angle sensors send the detected actual rotation angle of the spraying tube 22 to the controller 42 to establish a closed-loop control and complete the accurate control of the real-time wind directions.

The spraying method of the intelligent air-assisted spraying device for orchards of the disclosure enables real-time adjustment of the spraying directions of the spraying tubes according to a variety of canopy contours of different fruit trees, which achieves target-oriented spraying, maximizes the deposition of the pesticide in the canopy while minimizing pesticide drift in non-target areas, thereby enhancing the quality of the pesticide application.

The spraying method of the intelligent air-assisted spraying device for orchard further includes steps as follows.

A rotation angle of the second end of each spraying tube is obtained, an airflow demand model is established based on the contour of the canopy, the volume of the canopy, the branch and leaf density of the fruit tree and the rotation angle of the second end of each spraying tube 22, and the air outlet area of each spraying tube 22 is controlled based on the airflow demand model.

Specifically, the controller 42 establishes the airflow demand model based on the contour of the canopy, the volume of the canopy, the branch and leaf density of the fruit tree and the rotation angle of the second end of each spraying tube 22, the controller 42 calculates airflow demands of different parts of the fruit tree, that is, the air outlet area of each spraying tube 22. For the air outlet area of each spraying tube 22, the air volume and air speed of each spraying tube 22 are calculated, so as to achieve accurate control of air speed and air volume at different parts of the fruit tree.

Specifically, the airflow demand model is expressed as follows:

$$(CanopyProfile, CanopyVolume, LeafDensity) = F'(AngleVolume, AreaVolume),$$

where CanopyProfile represents the contour of the canopy; CanopyVolume represents the volume of the canopy; LeafDensity represents the branch and leaf density; Angle Volume represents a rotation angle of a spraying tube; AreaVolume represents an air outlet area; F represents a functional relationship among the contour of the canopy, the volume of the canopy, the branch and leaf density of the fruit tree, the rotation angle of the spraying tube and the air outlet area. Based on the airflow demand model, the air outlet area of each spraying tube 22 can be calculated.

Furthermore, the spraying method of the intelligent air-assisted spraying device for orchards further includes the following steps: an air speed and an air volume of each spraying tube 22 are calculated based on the air outlet area of each spraying tube 22; an intelligent spraying model is established based on the contour of the canopy, the volume of the canopy, the branch and leaf density of the fruit tree, the rotation angle of each spraying tube 22, the air speed of each spraying tube 22 and the air volume of each spraying tube 22; and a spray volume demand for each spraying area 100 is calculated based on the intelligent spraying model, and the on-off state of each nozzle is controlled (i.e., turning on or turning off each nozzle) based on the spray volume demand of each spraying area 100.

Specifically, the intelligent spraying model based on neural networks includes:
input quantities: the contour of the canopy, the volume of the canopy, the branch and leaf density;
an input vector: $x=(x_1\ x_2\ \ldots\ x_m)$;
output quantities: the rotation angle, the air speed, the air volume and the spray volume demand;
an output vector: $y=(y_1\ y_2\ \ldots\ y_n)$.

$$y_n = f_{output-layer}\left[\sum_{h=1}^{k} w_{nh} f_{hidden-layer}\left(\sum_{i=1}^{m} w_{hi} x_i + w_{h0}\right) + w_{n0}\right],$$

where m represents a number of input layer neurons, n represents a number of output layer neurons, k represents a number of hidden layer neurons, $f_{output-layer}$ represents an output layer transferring function, $f_{hidden-layer}$ represents a hidden layer transferring function; $w_{nh}$ represents a weight value between the hidden layer neurons k and the output layer neurons n; $w_{hi}$ represents a weight value between the hidden layer neurons k and the input layer neurons m; $w_{h0}$ represents a threshold value of the hidden layer neurons k; $w_{n0}$ represents a threshold value of the output layer neurons m; $x_i$ represents the i-th neuron.

A method of the back propagation (BP) neural network is utilized to conduct a spraying experiment. The data including information such as the contour of the canopy, the volume of the canopy, the branch and leaf density is input into the input layer to obtain a substantial amount of rotation angles, air speeds, air volumes, and spray volumes, which are used for training. This enables the acquisition of a capability, based on the perceptual abilities of the image collector and a lidar, to autonomously complete precise control over airflow direction (rotation angles), air speed, air volume, and spray volumes, thereby achieving an adaptive and precise variable rate spraying.

Figure 5:
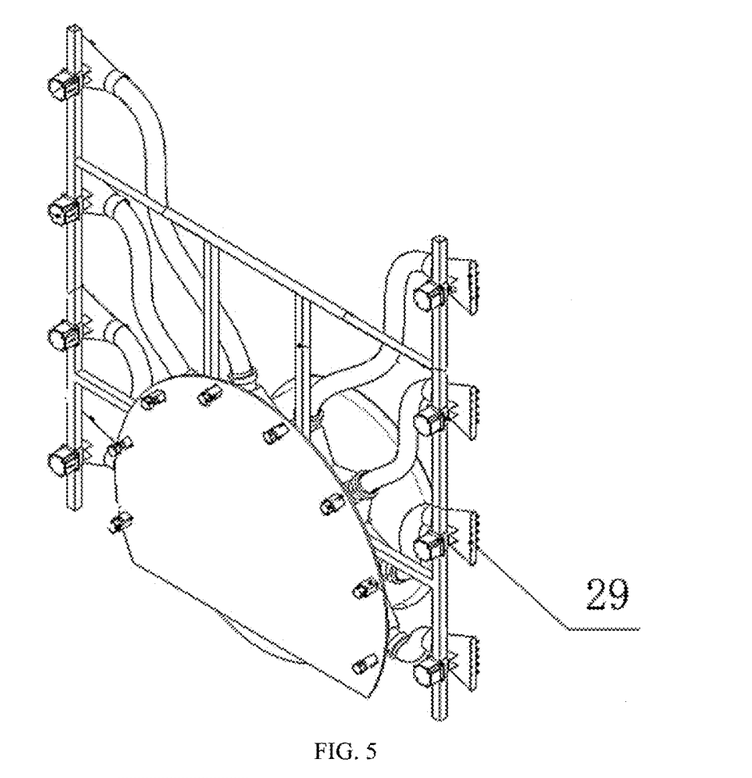
FIG. 5 illustrates a schematic structural diagram of nozzles of the intelligent air-assisted spraying device for orchards in the embodiment of the disclosure.

In addition, a spray volume demand model is:

$$(L_1 \; L_2 \; \ldots \; L_n) = N \begin{bmatrix} D_{11} & D_{12} & \ldots & D_{1j} \\ D_{21} & D_{22} & \ldots & D_{2j} \\ \vdots & \vdots & \ddots & \vdots \\ D_{i1} & D_{i2} & \ldots & D_{ij} \end{bmatrix},$$

where Ln represents a spray volume at the n-th air outlet; N represents a coefficient correction matrix for the combination of a number of nozzles and switches; $D_{ij}$ represents the turning on or turning off of the i-th nozzles of the j-th spraying tube (1 means the nozzle is turned off, 0 means the nozzle is turned on). The spray volumes for the fruit tree in different spraying areas are calculated using the established spraying demand model (i.e. intelligent spraying model). The number of nozzles that need to be turned on or turned off are calculated based on the spray volume demands, and thereby achieving precise control of spray volume in different areas by controlling the turning on or turning off of the switch valves 221. Specifically, as shown in FIG. 5.

Figure 6:
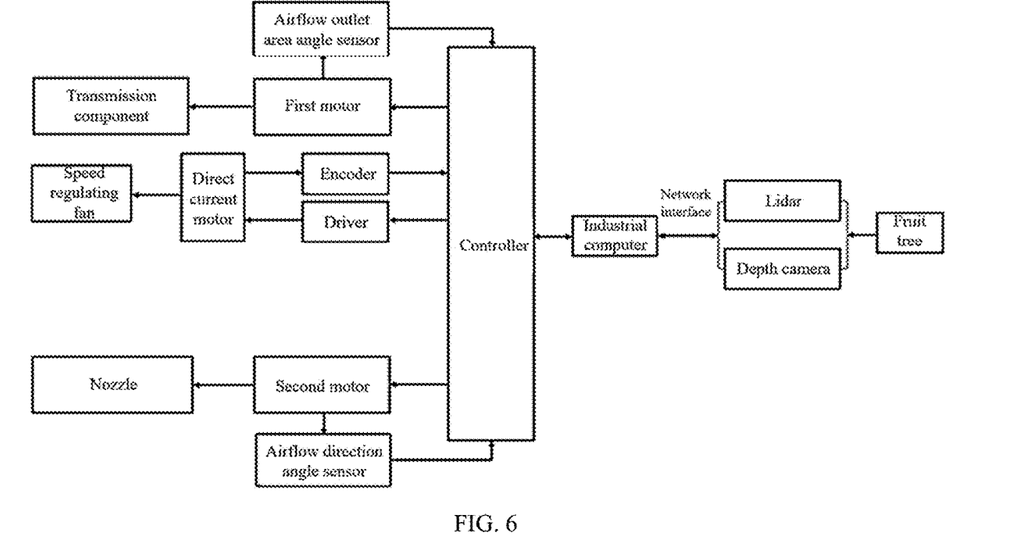
FIG. 6 illustrates a schematic flowchart of a method for using the intelligent air-assisted spraying device for orchards in the embodiment of the disclosure.
Figure 7:
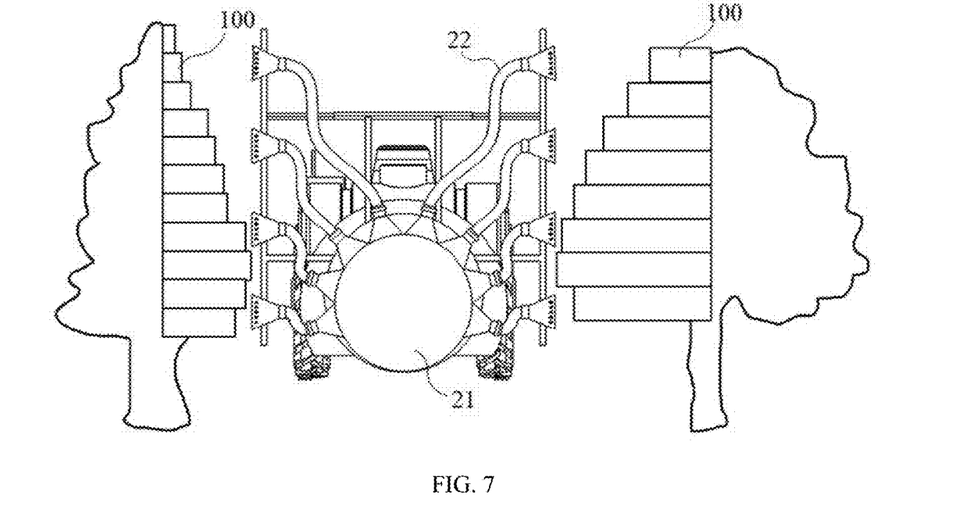
FIG. 7 illustrates a schematic diagram of spraying areas for different fruit tree shapes.
Figure 8:
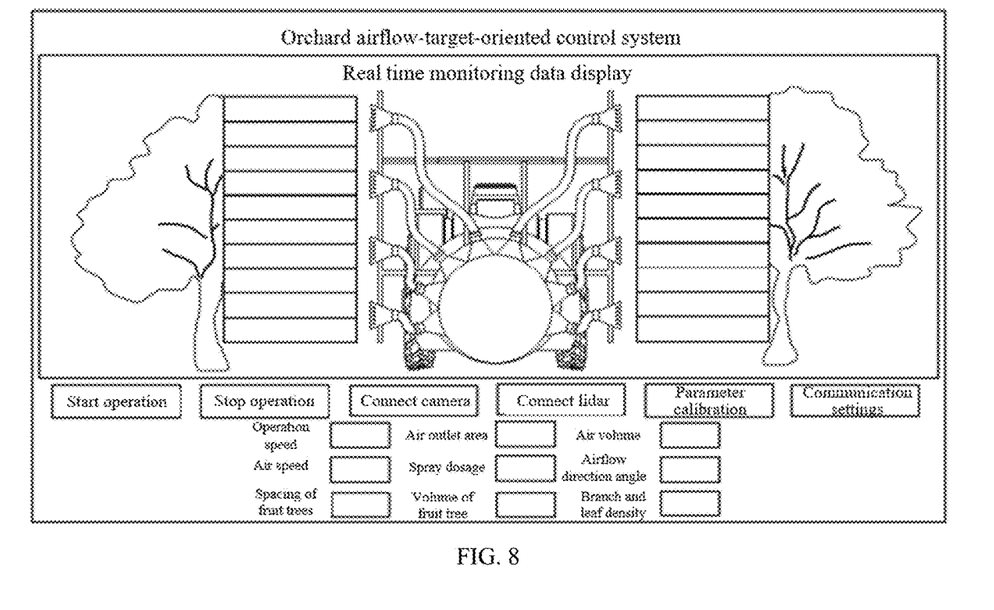
FIG. 8 illustrates a display interface of an industrial computer in the embodiment of the disclosure.

As shown in FIG. 6, the industrial computer 41 is provided with a display screen. Based on the principle of airflow target-oriented control, the display screen has a control interface for the orchard airflow-target-oriented control system. The control interface allows for the start and stop of the entire sprayer, communication parameters, and parameter verification. It can also set parameters such as fruit tree spacing, a height of the lidar 32, and a height of the image collector 31. In addition, it can also display real-time fruit tree volume, fruit tree height, fruit tree branch and leaf density, operating speed, fan speed, air outlet area, air speed, air volume, and rotation angle.

Finally, it should be noted that the above embodiments are only used to illustrate the technical solution of the disclosure, and not to limit it. Although the disclosure has been described in detail with reference to the aforementioned embodiments, those skilled in the art should understand that they can still modify the technical solutions recorded in the aforementioned embodiments or equivalently replace some of the technical features thereof. And these modifications or replacements do not make the essence of the corresponding technical solutions deviate from the spirit and scope of the technical solutions of the various embodiments of the disclosure.

What is claimed is:

1. An intelligent air-assisted spraying device for orchards comprising:
a traction mechanism, wherein the traction mechanism is provided with a spray tank;
a spraying system, wherein the spraying system comprises a main body and a plurality of spraying tubes, the main body is connected to the spray tank, first ends of the plurality of spraying tubes are communicated with the main body, second ends of the plurality of spraying tubes are configured to spray pesticide liquid, and the second ends of the plurality of spraying tubes are capable of rotating;
a collecting system, wherein the collecting system is disposed on the traction mechanism and is configured to collect a contour of a canopy, a volume of the canopy, and branch and leaf density of a fruit tree;
a processing-controlling system, wherein the processing-controlling system is disposed on the traction mechanism and is configured to perform grid partitioning on the canopy of the fruit tree based on the contour of the canopy, the volume of the canopy, and the branch and leaf density of the fruit tree to obtain a plurality of spraying areas, calculate an air outlet angle of each spraying tube according to the plurality of spraying areas, and control a rotation of the second end of each spraying tube according to the air outlet angle of each spraying tube, thereby to match a spraying range of the plurality of spraying tubes with the contour of the canopy of the fruit tree;
a plurality of adjustment mechanisms, configured to adjust air outlet areas of the plurality of spraying tubes, respectively; and wherein each of the plurality of adjustment mechanisms comprises:
a first motor, disposed in the main body;
a transmission component, disposed in the respective spraying tube; wherein the transmission component is connected to the first motor;
a plurality of fan blades, disposed in an annular manner along an inner wall of the respective spraying tube; wherein first sides of the plurality of fan blades are connected to the first motor through the transmission component, second sides of the plurality of fan blades define an air outlet of the respective spraying tube, which is a circular hole enclosed by the second sides of the plurality of fan blades, and the transmission component is configured to rotate to drive the plurality of fan blades to rotate through the first motor, thereby to adjust an area of the air outlet of the respective spraying tube;
wherein the transmission component of each adjustment mechanism comprises:
a bevel gear, disposed in the respective spraying tube, wherein the bevel gear is connected to the first motor;
a first gear, disposed in the respective spraying tube, wherein the first gear directly meshes with the bevel gear;
a rotating disc, disposed in the respective spraying tube, wherein a part of an outer side and an inner side of the rotating disc are provided with teeth, and the part of the outer side of the rotating disc meshes with the first gear, and the teeth of the part of the outer side of the rotating disc are configured to control a range adjusting the area of the air outlet of the respective spraying tube;

a plurality of second gears, disposed inside the respective spraying tube, wherein the plurality of second gears are disposed in an annular manner along the inner side of the rotating disc, each second gear meshes with the inner side of the rotating disc, and the plurality of second gears are respectively connected to the plurality of fan blades;

wherein the processing-controlling system is configured to calculate the air outlet areas of the plurality of spraying tubes based on the contour of the canopy, the volume of the canopy, the branch and leaf density of the fruit tree, and the air outlet angles of the plurality of spraying tubes, and drive the first motor of each of the plurality of adjustment mechanisms to rotate based on a corresponding one of the air outlet areas of the plurality of spraying tubes; and in each adjustment mechanism, the first motor is configured to rotate the first gear through the bevel gear, to enable the first gear to drive the rotating disc to rotate through the teeth of the part of the outer side of the rotating disc, thereby to drive the plurality of fan blades to rotate through the plurality of second gears meshing with the teeth of the inner side of the rotating disc, to adjust the area of the air outlet enclosed by the plurality of fan blades to the air outlet area of the respective spraying tube.

2. The intelligent air-assisted spraying device for orchards as claimed in claim 1, wherein the collecting system comprises:
an image collector, configured to collect the contour of the canopy of the fruit tree; and
a lidar, configured to collect the volume of the canopy, and the branch and leaf density of the fruit tree.

3. The intelligent air-assisted spraying device for orchards as claimed in claim 1, wherein the spraying system further comprises:
a fan, wherein the fan is connected to the main body and disposed between the main body and the spray tank; and the plurality of spraying tubes are disposed between the main body and the fan;
a plurality of nozzles, wherein the second end of each spraying tube is in a duckbill structure, and the plurality of nozzles are disposed in sequence along an extension direction of a length of the duckbill structure of each spraying tube;
a plurality of switch valves, disposed at the plurality of nozzles, respectively, and wherein the plurality of switch valves are disposed on the second end of each spraying tube;
wherein the processing-controlling system is further configured to control turning on or turning off of the plurality of switch valves based on the plurality of spraying areas.

4. The intelligent air-assisted spraying device for orchards as claimed in claim 1, wherein the spraying system further comprises:
an installation bracket, wherein the installation bracket is connected to the main body, the installation bracket comprises a pair of longitudinal rods disposed opposite to each other, and the plurality of the spraying tubes are disposed in sequence along an extension direction of a length of each longitudinal rod;
a plurality of second motors, connected to the second ends of the plurality of spraying tubes, respectively, and wherein each second motor is configured to adjust an orientation of the respective spraying tube.

5. The intelligent air-assisted spraying device for orchards as claimed in claim 1, wherein the processing-controlling system comprises:
an industrial computer, wherein the industrial computer is configured to perform the grid partitioning on the canopy of the fruit tree based on the contour of the canopy, the volume of the canopy, and the branch and leaf density of the fruit tree to obtain the plurality of spraying areas;
a controller, wherein the controller is configured to calculate the air outlet angle of each spraying tube according to the spraying areas, and control the rotation of the second end of each spraying tube according to the air outlet angle of each spraying tube, thereby to match the spraying range of the plurality of spraying tubes with the contour of the canopy of the fruit tree.

6. A spraying method of the intelligent air-assisted spraying device for orchards as claimed in claim 1, comprising:
collecting the contour of the canopy, the volume of the canopy, and the branch and leaf density of the fruit tree;
obtaining feature information of the fruit tree based on the contour of the canopy, the volume of the canopy, and the branch and leaf density of the fruit tree; and performing the grid partitioning on the canopy of the fruit tree based on the feature information of the fruit tree to obtain the plurality of spraying areas; and
calculating the air outlet angle of each spraying tube according to the spraying areas, and controlling the rotation of the second end of each spraying tube according to the air outlet angle of each spraying tube.

7. The spraying method as claimed in claim 6, further comprising:
obtaining a rotation angle of the second end of each spraying tube;
establishing an airflow demand model based on the contour of the canopy, the volume of the canopy, the branch and leaf density of the fruit tree and the rotation angle of the second end of each spraying tube;
controlling the air outlet area of each spraying tube based on the airflow demand model.

8. The spraying method as claimed in claim 7, further comprising:
calculating an air speed and an air volume of each spraying tube based on the air outlet area of each spraying tube;
establishing an intelligent spraying model based on the contour of the canopy, the volume of the canopy, the branch and leaf density of the fruit tree, the rotation angle of the second end of each spraying tube, the air speed of each spraying tube and the air volume of each spraying tube;
calculating a spray volume demand for each spraying area based on the intelligent spraying model; and
controlling each nozzle to be turned on or turned off based on the spray volume demand of each spraying area.

9. The intelligent air-assisted spraying device for orchards as claimed in claim 4, wherein the spraying system further comprises:
a plurality of angle sensors, configured to detect rotation angles of the plurality of spraying tubes, and send the rotation angles of the plurality of spraying tubes to the processing-controlling system, and the processing-controlling system is configured to control the plurality of second motors to rotate according to the rotation angles of the plurality of spraying tubes, thereby to adjust the rotation of the second ends of the plurality of spraying tubes.

10. An intelligent air-assisted spraying device for orchards comprising:
- a traction mechanism, wherein the traction mechanism is provided with a spray tank;
- a spraying system, wherein the spraying system comprises:
  - a main body, connected to the spray tank;
  - a plurality of spraying tubes, communicated with the main body; wherein ends of the plurality of spraying tubes facing away from the main body are configured to spray pesticide liquid;
  - an installation bracket, connected to the main body, wherein the installation bracket comprises a pair of longitudinal rods disposed opposite to each other, the ends of the plurality of the spraying tubes are symmetrically disposed on the longitudinal rods, and arranged along a lengthwise direction of each longitudinal rod;
  - a plurality of second motors, disposed on the longitudinal rods, and connected to the second ends of the plurality of spraying tubes, respectively; and wherein the plurality of second motors are configured to adjust orientations of the plurality of spraying tubes, respectively;
- a collecting system, wherein the collecting system is disposed on the traction mechanism and configured to collect a contour of a canopy, a volume of the canopy, and branch and leaf density of a fruit tree;
- a processing-controlling system, wherein the processing-controlling system is disposed on the traction mechanism and configured to perform grid partitioning on the canopy of the fruit tree based on the contour of the canopy, the volume of the canopy, and the branch and leaf density of the fruit tree to obtain a plurality of spraying areas, calculate air outlet angles of the plurality of spraying tubes according to the plurality of spraying areas, and control the plurality of second motors to drive the second ends of the plurality of spraying tubes to rotate according to the air outlet angles of the plurality of spraying tubes, thereby to match a spraying range of the plurality of spraying tubes with the contour of the canopy of the fruit tree; and
- a plurality of adjustment mechanisms, wherein each adjustment mechanism comprises:
  - a first motor, disposed in the main body;
  - a bevel gear, disposed in the respective spraying tube, and connected to the first motor;
  - a first gear, disposed in the respective spraying tube, and directly meshing with the bevel gear;
  - a rotating disc, disposed in the respective spraying tube, wherein an outer side of the rotating disc is partially provided with teeth, and an inner side of the rotating disc is provided with teeth; and the first gear directly meshes with the teeth of the outer side of the rotating disc;
  - a plurality of second gears, disposed in an annular manner along the inner side of the rotating disc, and directly meshing with the teeth of the inner side of the rotating disc; and
  - a plurality of fan blades, disposed inside the rotating disc, wherein first sides of the plurality of fan blades close to the inner side of the rotating disc are respectively connected to the plurality of second gears, and second sides of the plurality of fan blades facing away from the inner side of the rotating disc define an air outlet of the respective spraying tube, which is surrounded by the second sides of the plurality of fan blades;
- wherein the processing-controlling system is further configured to calculate an area of the air outlet of each spraying tube based on the contour of the canopy, the volume of the canopy, the branch and leaf density of the fruit tree, and the air outlet angle of each spraying tube, and drive the first motor of each adjustment mechanism to rotate based on the area of the air outlet of each spraying tube, the first motor is configured to drive the first gear to rotate through the bevel gear to enable the first gear to drive the rotating disc to rotate through the teeth of the outer side of the rotating disc, thereby to drive the plurality of second gears meshing with the teeth of the inner side of the rotating disc to rotate, to adjust the air outlet enclosed by the plurality of fan blades to the area of the air outlet calculated by the processing-controlling system.

* * * * *